United States Patent Office 3,366,640
Patented Jan. 30, 1968

3,366,640
ANILINO NICOTINIC ACID DERIVATIVES
Margaret H. Sherlock, Bloomfield, and Nathan Sperber, North Caldwell, N.J., assignors to Schering Corporation, Bloomfield, N.J., a corporation of New Jersey
No Drawing. Filed June 14, 1966, Ser. No. 557,389
Claims priority, application Great Britain, Feb. 28, 1966, 8,638/66
The portion of the term of the patent subsequent to Aug. 22, 1984, has been disclaimed
5 Claims. (Cl. 260—295.5)

ABSTRACT OF THE DISCLOSURE 2-(nitroanilino)nicotinic acids are prepared by condensing a 2-halonicotinic acid with a nitro substituted aniline by heating the reactants in high boiling non-reactive solvents. The 2-anilino nicotinic acids, or appropriate pharmaceutically acceptable derivatives thereof, are therapeutically useful as anti-inflammatory agents.

---

This invention relates to the compositions of matter identifiable in the art of chemistry as 2-anilino-nicotinic acids, and to processes for making and using such compositions.

The invention sought to be patented in one of its composition aspects is described as residing in the concept of a chemical compound having the molecular structure a 2-(nitroanilino)nicotinic acid optionally having a further substituent in the anilino portion of the molecule, said optional substituent being a member of the group consisting of chloro, bromo, trifluoromethyl and lower alkyl. Included within this concept are the pharmaceutically acceptable alkali and alkaline earth metal and amine salts thereof and the hydroxamic acid derivatives thereof.

The invention sought to be patented in another of its composition aspects resides in the concept of pharmaceutical formulations containing a novel composition of matter of this invention.

The invention sought to be patented in one of its process aspects is described as residing in those concepts which comprise the condensation of certain 2-substituted nicotinic acids, or the alkyl esters thereof, with an appropriately substituted nitroaniline.

The invention sought to be patented in another of its process aspect is described as residing in the concept of treating and alleviating inflammation and inflammatory conditions by administering a therapeutically effective quantity of a novel composition of matter of this invention. Another process aspect of this invention is the use of the novel compositions of this invention to cause an analgesic effect. Another process aspect of this invention is the use of the novel compositions of matter of this invention in combination with other active therapeutics to provide desirable complementary effects when employed in the treatment of inflammatory conditions and in the treatment of pain.

A more specific representation of the tangible embodiments of this invention are the chemical compositions having the structural formula:

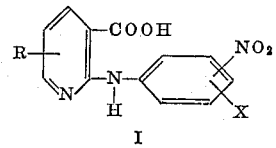

I wherein X is a member of the group consisting of hydrogen, chloro, bromo, trifluoromethyl, and lower alkyl, and R is either hydrogen or lower alkyl, and the pharmaceutically acceptable alkali and alkaline earth and amine salts thereof, and such derivatives which upon hydrolysis are converted to the 2-(nitroanilino)-nicotinic acid.

The compounds are prepared by condensing a 2-halonicotinic acid with the appropriate nitroaniline, the condensation being effected by heating a mixture at least equimolar quantities of the reactants. Preferably, the compounds are prepared by heating a 2-chloronicotinic acid or a 2-bromonicotinic acid with the appropriate nitroaniline, said heating taking place in a high boiling solvent such as glycols (e.g. ethylene glycol, propylene glycol and the like) and aromatic hydrocarbons (e.g. xylene or cymene), or by merely melting the reactants in the presence of each other by the usual and standard techniques. In the melting procedure the reaction temperature will rise as the reaction proceeds. The reaction is completed generally after 15-30 minutes as evidenced by a fall in reaction temperature. The fused melt is then treated with dilute aqueous base, for example, sodium carbonate or sodium hydroxide and extracted with a water immiscible solvent. The product, in the form of a soluble salt, is in the aqueous layer and is precipitated therefrom by acidifying with dilute mineral acid, filtered and recrystallized.

During the course of the reaction for each mole of reaction product there is formed a mole of hydrogen halide. Accordingly we prefer to employ 2 moles of the nitroaniline for each mole of the 2-substituted nicotinic acid reactant. The extra mole of the former readily takes up the hydrogen halide formed in the form of an acid addition salt.

Alternatively, there may be employed an ester (lower alkyl) of the 2-halo-nicotinic acid. The ester group is subsequently hydrolyzed. (In some instances hydrolysis may occur during the reaction but the alcohol produced does not interfere with the desired reaction and is easily removed during isolation and purification.)

In addition to the use of the reactants in the above described nucleophilic displacement reaction, other equivalently functioning reactants may be employed to produce the desired novel compositions of this invention. For example, instead of employing a 2-halo-nicotinic acid (or ester thereof), a nicotinic acid (or ester thereof) having an alkoxy, alkythio, methoxysulfonyl, or other equivalently functioning substituent in the 2-position thereof may be so employed. In such instances, the same reaction conditions used in the previously described nucleophilic displacement reaction would be employed. Alternatively, an N-substituted nitroaniline reactant may be heated with the foregoing 2-substituted nicotinic acids (or esters thereof) instead of employing the previously described nitroanilines. Such equivalently functioning N-substituted nitroaniline reactants include those nitroanilines wherein a hydrogen atom attached to the nitrogen atom has been replaced with substituents such as benzyl or acyl. Again, in the use of these equivalently functioning reactants the previously described nucleophilic displacement reaction conditions would be employed. In those instances wherein the N-substituted nitroaniline reactant has been employed, the 2-(N-substituted nitroanilino)-nicotinic acid (or ester thereof) may be subjected to standard procedures to remove the benzyl and acyl radicals from the nitrogen atom. The preferred reactions may be summarized by the following schematic representation:

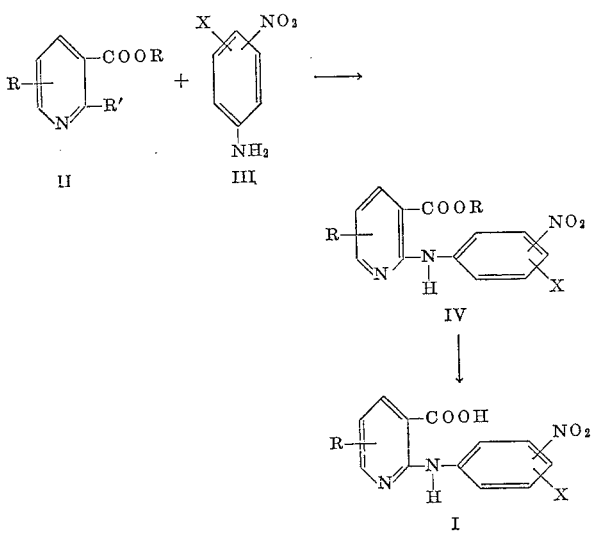

wherein R is hydrogen or lower alkyl, R' is chloro, bromo, alkoxy, alkylthio, methoxysulfonyl, nitro or other equivalently functioning substituent, and X is hydrogen, chloro, bromo, trifluoromethyl, or lower alkyl.

Alternatively, the compounds embraced within the concepts of this invention may also be prepared from 2-amino nicotinic acid (or esters thereof) by means of a nucleophilic displacement reaction with an appropriately nitro substituted phenyl halide. As in the previously described nucleophilic displacement reaction the preparation is effected by heating the reactants together in a sealed tube, either in a high boiling solvent such as xylene, cymene or by merely melting the reactants in the presence of each other. In those instances wherein the halogen substituent of the aniline reactant is ortho to the nitro group, less vigorous conditions as required and the reaction need not be conducted in a sealed tube.

The foregoing reaction may be summarized by the following schematic representation:

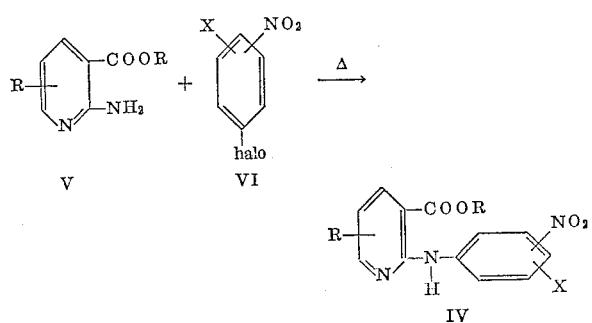

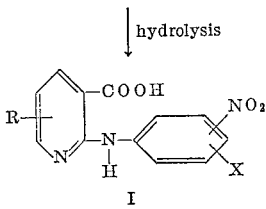

wherein R and X are as previously defined.

Still another alternative method is the condensation of a 2-chloronicotinamide with the appropriately substituted aniline to produce a 2-(nitroanilino)-nicotinamide, which upon hydrolysis yields the desired acid.

Representative of the preferred nitroaniline reactants are 2-methyl-3-nitroaniline, 2-nitroaniline, 3-nitroaniline, 3-methyl-5-nitroaniline, 3-trifluoromethyl-5-nitroaniline, 2-nitro-3-methylaniline, and the like.

The preferred nicotinic acids which are utilizable in this reaction are 2-chloro-nicotinic acid, 2-bromo-nicotinic acid and alkyl substitution products thereof such as 2-chloro-6-methyl nicotinic acid and other readily available or preparable 2-halogeno-lower alkyl nicotinic acids.

The compounds prepared according to the foregoing procedures are, in general crystalline solids purified by crystallization from aqueous alcohol, benzene, ethyl acetate, isopropanol, or other appropriate solvents.

The following examples are illustrative of the methods of synthesis of the tangible embodiments of this invention:

EXAMPLE 1

2-(2-methyl-3-nitroanilino)-nicotinic acid

Mix 15.7 g. (0.1 mole) of 2-chloronicotinic acid with 30.4 g. (0.2 mole) of 2-methyl-3-nitroaniline. Stir the mixture and heat to 220–230° C. (the temperature will rise to about 175–200° C. as the reaction proceeds). After the reaction is completed as evidenced by a fall in temperature, cool the mass and triturate in dilute hydrochloric acid. Filter and wash the solid with water. Recrystallize from acetonitrile.

Alternatively, the compound of this example 2-(2-methyl-3-nitroanilino)-nicotinic acid is prepared by heating together 6.2 g. of ethyl-2-chloronicotinate and 10 g. of 2-methyl-3-nitroaniline in 10 ml. of diethylene glycol at 220–240° C. for 10 minutes. Cool, add 50 ml. of water, basify, and extract with ether. Evaporate and triturate with ethanol. Recrystallize the ethyl ester of this example from methanol, M.P. 126–127° C.

Dissolve 30.8 g. of the ethyl ester in a solution of 13.25 g. of potassium hydroxide in 1 liter of methanol. Heat on a steam bath overnight allowing the methanol to evaporate. Dissolve the residue in water, acidify with dilute hydrochloric acid and filter obtaining the acid of this example. Recrystallize the desired product from acetonitrile to give the product of this example, M.P. 241–242° C.

Alternatively the 2-chloronicotinic acid may be replaced with equivalent quantities of 2-methoxy nicotinic acid, 2-methylthionicotinic acid, 2-methoxysulfonylnicotinic acid, and by following substantially the same procedures outlined in this example there is produced the desired 2-(2-methyl-3-nitroanilino)-nicotinic acid.

Similarly, the 2-methyl-3-nitroaniline may be substituted with equivalent quantities of 2-nitroaniline,
3-nitroanline,
4-nitroaniline,
2-methyl-5-nitroaniline,
2-nitro-5-methylaniline,
3-trifluoromethyl-5-nitroaniline,
2-nitro-5-trifluoromethylaniline,
2-bromo-5-nitroaniline,
3-bromo-5-nitroaniline, 2-nitro-5-bromoaniline,
2-chloro-5-nitroaniline,
3-chloro-5-nitroaniline,
2-nitro-5-chloroaniline,
2-trifluoromethyl-3-nitroaniline,
2-trifluoromethyl-4-nitroaniline,
2-nitro-3-trifluoromethylaniline, and by reacting said aniline reactants with 2-chloro-nicotinic acid (or with the equivalently functioning nicotinic acids such as 2-bromo-nicotinic acid, 2-methoxy-nicotinic acid, 2-methyl-thionicotinic acid, 2-methoxy-sulfonyl-nicotinic acid, or 2-nitro-nicotinic acid), substantially according to the procedures outlined for this example there is produced 2(2-nitroanilino)-nicotinic acid,
2(3-nitroanilino)-nicotinic acid,
2(4-nitroanilino)-nicotinic acid,
2(2-methyl-5-nitroanilino)-nicotinic acid,
2(2-nitro-5-methylanilino)-nicotinic acid,
2(3-trifluoromethyl-5-nitroanilino)-nicotinic acid,
2(2-nitro-5-trifluoromethylanilino)-nicotinic acid,
2(2-bromo-5-nitroanilino)-nicotinic acid,
2(3-bromo-5-nitroanilino)-nicotinic acid,
2(2-nitro-5-bromoanilino)-nicotinic acid,
2(2-chloro-5-nitroanilino)-nicotinic acid,
2(3-chloro-5-nitroanilino)-nicotinic acid,
2(2-nitro-5-chloroanilino)-nicotinic acid,
2(2-trifluoromethyl-3-nitroanilino)-nicotinic acid,
2(2-trifluoromethyl-4-nitroanilino)-nicotinic acid,
2(2-nitro-3-trifluoromethyl-anilino)-nicotinic acid,
respectively.

In those instances wherein a particular reactant is not specifically described in the literature, such reactants may be prepared according to the methods used to prepare the known reactants suitable for the foregoing reactions.

EXAMPLE 2

2-(2-methyl-3-nitroanilino)-nicotinic acid

Mix 19.5 g. (0.1 mole) of potassium 2-chloronicotinate, 30.4 (0.2 mole) of 2-methyl-3-nitroaniline, 1 g. copper powder and 100 ml. of n-amyl alcohol. Stir and reflux for 6 hours. Cool, make alkaline with sodium bicarbonate solution. Steam-distil to remove unreacted 2-methyl-3-nitroaniline. Cool the pot residue, filter and extract the filtrate with ether. Separate the aqueous phase, acidify and filter. Recrystallize from acetonitrile to yield the desired product of this example.

EXAMPLE 3

2-(2-methyl-3-nitroanilino)-nicotinic acid

Mix 5 gms. of 2-aminonicotinic acid, 7 gms. of 2-methyl-3-nitro-bromobenzene, 2 gms. of potassium carbonate and 0.5 gm. of copper powder in 20 ml. of water, and in a sealed tube, heat the resulting mixture at 160° C. for 8 hours. Break the seal, cool the mass, make alkaline with sodium bicarbonate and steam-distil to remove the unreacted 2-methyl-3-nitrobromobenzene. Cool, acidify and filter the residue to obtain the desired product which is recrystallized from isopropyl acetate.

The tangible embodiments of this invention are acids and are soluble in aqueous alkali. The alkali and the alkaline earth metal and amine salts of the novel compounds may be prepared by methods well known in the art for the preparation of a salt of a strong base with a weak acid. For example, the alkali metal salt, preferably the sodium salt may be obtained by evaporation of an alkaline (with sodium hydroxide) solution of the anilino-nicotinic acid described herein. Alternatively, non-aqueous media may be employed. For example, by mixing together an alcoholic solution of an anilino-nicotinic acid with an alcoholic solution containing a stoichiometric quantity of an alkali metal alkoxide and after evaporating the solvent, there is obtained the alkali metal salt which is soluble in water. In similar fashion and by other known techniques other derivatives—i.e., other non-toxic pharmaceuatically acceptable salts are prepared. Representative of such salts are, in addition to sodium, those wherein the cation is ammonium, diethanolammonium, potassium, lithium, calcium, aluminum and other such metals which advantageously allow for greater solubility or greater ease in formulation and are considered the full equivalent of the free carboxylic acid. Also included within this class of useful pharmaceutically acceptable derivatives are the hydroxamic acid derivatives which are obtained by the condensation of an alkyl ester of the hereinabove described anilino nicotinic acids with hydroxylamine hydrochloride in sodium methoxide.

The tangible embodiments of the invention, in the form of the free acid or non-toxic salt thereof, possess the inherent applied use characteristic of exerting an anti-inflammatory response as determined by pharmacological evaluation, and also exert an analgesic action. They are thus useful in treating inflammation and in treating certain symptoms of pain.

The treatment of inflammation with concommittant absence of side effects induced by the anti-inflammatory agent has been a goal long sought. In general, steroids having cortisone-like activity have been employed for this purpose. The use of steroid therapy suffers from the drawback of side effects induced by the corticoid such as electrolyte imbalance, water retention and the like. Our novel compositions are rather specific in their action and are non-steroidal in character, thus the side effects due to steroid therapy are eliminated. It is also known that non-steroidal compounds employed in the treatment of inflammatory conditions have been found to exhibit deleterious side effects, such as for example—ulceration of the gastrointestinal tract. By the employment of standard laboratory techniques the novel compounds of this invention have demonstrated a marked lessening of this ulcerative effect and thus, although the anti-inflammatory compounds of this invention may demonstrate less potency than other previously used compounds the lack of the aforementioned side effects enhances the functional-use indices of the novel compounds of this invention.

It is known that the potencies of drugs in delaying the appearance of edema in rats paw is closely correlated with their potencies as anti-inflammatory agents. The Carrageenin Induced Inflammation (Carrageenin Paw) Test is a standard pharmacological test for determining anti-inflammatory activity. Certain agents exhibiting anti-inflammatory activity in this test are also analgesic with carry-over to different species having been demonstrated. Such agents include phenylbutazone, aspirin and antipyrine. We have found that the anilino nicotinic acids described herein exhibit an activity as evidenced by Carrageenin Paw Test are equal to or greater than that of the commonly used nonsteroid anti-inflammatory agent, phenylbutazone. The compounds of this invention also exhibit marked and potent analgesic effects. Thus, the anilino nicotinic acids described herein are useful in treating inflammation, especially that associated with rheumatoid and osteoporosis joint diseases, collagen diseases, bursitis, gouty arthritis, spondylitis and the like.

The anilino nicotinic acids of this invention will elicit an anti-inflammatory response when administered in a dose range of about 100 to 500 mg. daily. In animals a dose of about 5 mg. per kg. body weight is sufficient to elicit an anti-inflammatory response of the compounds described herein; 2 - (2 - methyl - 3-nitroanilino)-nicotinic acid and 2-(3-methyl-5-nitroanilino)-nicotinic acid appear most potent especially in comparison with the standard phenylbutazone in protecting the animals against a lethal irradiation of ultra violet light. In addition, these compounds, especially 2-(2-methyl-3-nitroanilino)-nicotinic acid elicits a potent analgesic effect demonstratable pharmacologically.

The compositions described herein may be administered parenterally or enterally by incorporating them into dosage forms such as tablets, capsules, elixirs, solutions, suspensions and the like. Representative embodiments of the formulations containing the compositions of this invention are as follows:

*Tablet formulations*

(I) Formula and method of manufacture for 2-(2-methyl-3-nitroanilino)-nicotinic acid, Enteric Coated Tablets.—Formula:

| | Mg./core |
|---|---|
| 2-(2-methyl-3-nitroanilino)-nicotinic acid | 100.0 |
| Citric acid | 1.0 |
| Lactose, USP | 33.5 |
| Dicalcium phosphate | 70.0 |
| Pluronic F-68 | 30.0 |
| Sodium lauryl sulfate | 15.0 |
| Polyvinylpyrrolidone | 15.0 |
| Carbowax 1500 | 4.5 |
| Carbowax 6000 | 45.0 |
| 3A Alcohol (50 ml./1000 cores) | |
| Corn starch | 30.0 |
| Dry: | |
| Sodium lauryl sulfate | 3.0 |
| Magnesium stearate | 3.0 |
| Tablet weight | 350.0 |

*Procedure.*—The 2-(2-methyl-3-nitroanilino)-nicotinic acid is mixed with the citric acid, lactose, dicalcium phosphate, pluronic and sodium lauryl sulfate. The above mixture is screened through a No. 60 screen and damp granulated with an alcoholic solution consisting of polyvinylpyrrolidone, Carbowax 1500 and 6000. Add additional alcohol, if necessary, to bring powders to a pasty mass. Add corn starch and continue mixing until uniform granules are formed. Pass through a No. 10 screen, tray and dry in oven at 100° C. for 12–14 hours. Reduce dried granulation through a No. 16 screen add sodium lauryl sulfate and magnesium sulfate, mix and compress into desired shape on a tablet machine.

*Coating.*—The above cores are treated with a lacquer and dusted with talc to prevent moisture absorption. Subcoat layers are added to round out the core. A sufficient number of lacquer coats are applied to make the core enteric. Additional sub-coats and smoothing coats are applied to completely round out and smooth the tablet. Color coats are applied until desired shade is obtained. After drying the coated tablets are polished to give the tablets an even gloss.

(II) Combinations of 2-(2-methyl-3-nitroanilino)-nicotinic acid with other drugs.

(A) 2-(2-methyl-3-nitroanilino)-nicotinic acid and betamethasone.

Formula:

| | Mg./tablet |
|---|---|
| 2-(2-methyl-3-nitroanilino)-nicotinic acid | 100.000 |
| Betamethasone | [1] 0.645 |
| Citric acid | 1.000 |
| Lactose | 32.855 |
| Dicalcium phosphate | 70.000 |
| Pluronic, F-68 | 30.000 |
| Sodium lauryl sulfate | 15.000 |
| Polyvinylpyrrolidone | 15.000 |
| Carbowax 1500 | 4.500 |
| Carbowax 6000 | 45.000 |
| 3A Alcohol (50 ml./1000 tablets) | |
| Corn starch | 30.000 |
| Dry: | |
| Sodium Lauryl sulfate | 3.00 |
| Magnesium stearate | 3.00 |
| Tablet weight | 350.00 |

[1] Includes 7½% excess.

*Procedure.*—Mix together 2-(2-methyl-3-nitroanilino)-nicotinic acid, citric acid, pluronic, sodium lauryl sulfate, lactose and dicalcium phosphate. Screen through No. 60 mesh screen. Granulate the above mixed powders with an alcoholic solution containing betamethasone, polyvinylpyrrolidone, Carbowax 1500 and 6000. Add additional alcohol, if necessary, to bring powder mix to a pasty mass. Add corn starch and continue mixing until uniform damp granules are formed. Pass damp granulation through a No. 10 screen, tray and dry in oven at 100° C. for 12–14 hours. Reduce dried granulation through a No. 16 screen, add sodium lauryl sulfate and magnesium sulfate mix and compress on a tablet machine to specifications.

(B) 2-(2-methyl-3-nitroanilino)-nicotinic acid and aspirin.

Formula:

| | Mg./tablet |
|---|---|
| Gran. I acetylsalicylic acid, cryst. | 300.00 |
| Gran. II 2-(2-methyl-3-nitroanilino)-nicotinic acid | 100.00 |
| Citric acid | 1.00 |
| Lactose | 30.50 |
| Dicalcium phosphate | 70.00 |
| Pluronic, F-68 | 30.00 |
| Sodium lauryl sulfate | 15.00 |
| Polyvinylpyrrolidone | 15.00 |
| Carbowax 1500 | 4.50 |
| Carbowax 6000 | 45.00 |
| 3A Alcohol (50 ml./1000 tab.) | |
| Corn starch | 30.00 |
| Dry: | |
| Sodium lauryl sulfate | 3.00 |
| Sterotex | 6.00 |
| Tablet weight | 650.00 |

*Procedure.*—Mix together 2-(2-methyl-3-nitroanilino)-nicotinic acid, citric acid, pluronic, sodium lauryl sulfate, lactose and dicalcium phosphate. Screen through No. 60 mesh screen. Granulate the above mixed powders with an alcoholic solution containing betamethasone, polyvinylpyrrolidone, Carbowax 1500 and 6000. Add additional alcohol, if necessary, to bring powder mix to a pasty mass. Add corn starch and continue mixing until uniform damp granules are formed. Pass damp granulation through a No. 10 screen, tray and dry in oven at 100° C. for 12–14 hours. Reduce dried granulation through a No. 16 screen, add sodium lauryl sulfate and magnesium sulfate mix and compress on a tablet machine to specifications. To the dried screened portion of Granulation II, add crystalline acetylsalicylic acid, 20 mesh and mix for 30 minutes. Add sodium lauryl sulfate and sterotex mix and compress into tablets on tablet machine to desired specifications.

(III) Capsule formulations (A) Formula:

| | mg./capsule |
|---|---|
| 2-(2-methyl-3-nitroanilino)-nicotinic acid | 100.00 |
| Citric acid | 1.00 |
| Pluronic, F-68 | 40.00 |
| Sodium lauryl sulfate | 20.00 |
| Lactose | 238.00 |
| Magnesium stearate | 101.00 |
| | 400.00 |

*Procedure.*—Mix together 2-(2-methyl-3-nitroanilino)-nicotinic acid, citric acid, pluronic, sodium lauryl sulfate and lactose. Pass through a No. 80 screen. Add magnesium stearate, mix and encapsulate into the proper size 2 piece gelatin capsule.

(IV) Oral suspension

Formula: mg./5 ml.
- 2-(2-methyl-3-nitroanilino)-nicotinic acid, micronized _____ 100.0
- Vegum, Vanderbilt _____ 50.0
- Standard granulated sugar, USP _____ 2500.0
- Sorbitol solution, USP _____ 1250.0
- Sodium saccharin, NF _____ 50.0
- Sodium benzoate, USP _____ 5.0
- Ethanol, USP _____ ml__ 0.025
- Menthol, USP _____ 1.000
- Flavor, q.s.
- Purified water, USP, to make 5 ml.

*Method of manufacture.*—Dissolve the sodium saccharin, sodium benzoate, standard granulated sugar and sorbitol solution in approximately 80% of the required amount of water. Disperse the Veegum in approximately 5% of the required amount of water and add the dispersion to the previously prepared syrup. Prepare a slurry of the 2-(2-methyl-3-nitroanilino)-nicotinic acid with approximately 10% of the required amount of water and pass through a suitable colloid mill until free of grittiness. Add the milled active slurry to the batch. Dissolve the menthol and flavor in the alcohol and add the resulting solution to the batch. Add sufficient purified water to bring the batch to total volume. Agitate until uniform.

(VII) Topical Ointment

Formula: mg./gm.
- 2-(2-methyl-3-nitroanilino)-nicotinic acid, micronized _____ 20.0
- Methylparaben, USP _____ 0.5
- Propylparaben, USP _____ 0.1
- Petrolatum, USP to make 1 gm.

*Method of manufacture.*—Dissolve the parabens in the melted petrolatum. Prepare a slurry of the 2-(2-methyl-3-nitroanilino)-nicotinic acid with a portion of the paraben solution. Pass the slurry through a suitable colloid mill until free of grittiness. Add the slurry to the remainder of the paraben solution and mix while cooling to room temperature.

*Dosage forms*

Parenteral suspension:
- 2-(2-methyl-3-nitroanilino)-nicotinic acid, microppt _____ mg__ 50.0
- Sodium citrate _____ 10.0
- Tween 80 _____ mg__ 1.0
- CMC 7 LP _____ 5.0
- Methylparaben, USP _____ 1.8
- Propylparaben, USP _____ .2
- Benzyl alcohol _____ 9.0
- Purified water ad q.s., 1 ml.

Sterile microppt 2-methyl-3-nitroanilino)-nicotinic acid (alternatives micronized steam sterilized or micronized ethylene oxide sterilized) is dispersed in a 10× sterile filtered concentrate of Tween 80 and sodium citrate. When dispersed a 1.33× sterile filtered vehicle of the remaining components is added. When uniformly dispersed sufficient water for injection is added to final volume. The product is then stored under aseptic conditions until packaged into multiple dose vials.

We claim:

1. A compound of the group consisting of anilino nicotinic acids having the structural formula:

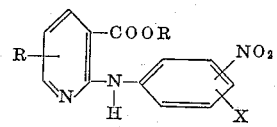

and the non-toxic pharmaceutically acceptable salts thereof, wherein R is a member of the group consisting of hydrogen and lower alkyl, and X is a member of the group consisting of hydrogen, chloro, bromo, trifluoromethyl and lower alkyl.

2. A compound of claim 1 wherein R is hydrogen and X is methyl.

3. A compound of claim 1 wherein R is hydrogen and X is methyl, said compound being 2-(2-methyl-3-nitroanilino)-nicotinic acid.

4. A compound of claim 1 wherein X is trifluoromethyl, and R is hydrogen, said compound being 2-(2-trifluoromethyl-3-nitroanilino)-nicotinic acid.

5. A compound of claim 1 wherein X and R are hydrogen, said compound being 2-(3-nitroanilino)-nicotinic acid.

References Cited

UNITED STATES PATENTS 3,107,263  10/1963  Scherrer _____ 260—518

JOHN D. RANDOLPH, *Primary Examiner.*

WALTER A. MODANCE, *Examiner.*

A. L. ROTMAN, *Assistant Examiner.*

Notice of Adverse Decision In Interference

In Interference No. 97,399 involving Patent No. 3,366,640, M. H. Sherlock and N. Sperber, ANILINO NICOTINIC ACID DERIVATIVES, final judgment adverse to the patentees was rendered Mar. 31, 1972, as to claims 1, 2 and 3.

[*Official Gazette May 30, 1972.*]